United States Patent [19]

Sher

[11] 4,130,832

[45] Dec. 19, 1978

[54] THREE-DIMENSIONAL DISPLAY

[75] Inventor: Lawrence D. Sher, Acton, Mass.

[73] Assignee: Bolt Beranek and Newman Inc., Cambridge, Mass.

[21] Appl. No.: 814,711

[22] Filed: Jul. 11, 1977

[51] Int. Cl.$^2$ .............................................. H04N 9/54
[52] U.S. Cl. ...................................... 358/89; 350/295
[58] Field of Search ..................... 350/295; 358/88, 89

[56] References Cited

U.S. PATENT DOCUMENTS 3,493,290  2/1970  Traub ............................... 350/295 X

FOREIGN PATENT DOCUMENTS 380473  9/1932  United Kingdom ..................... 350/295

OTHER PUBLICATIONS

Rawson, *IEEE Spectrum*, vol. 6, No. 9, Sep. 1969, pp. 37–43.
Hobgood, *A Three*-Dimensional Computer Graphics Display Using a Varifocal Mirror, Masters Thesis submitted to the faculty of the University of N. Carolina at Chapel Hill, 1969.
Leibowitz et al., *an Evaluation of Three*-Dimensional Displays, Office of Naval Research, Contract No. NONB 2300(65), Jan. 1965.
Bodine, *Journal of Applied Mechanics*, 26, 1959, pp. 666–668.
Traub, *A New 3-Dimensional Display Technique*, The Mitre Corporation report M68-4, May 1968, pp. 1–225.

*Primary Examiner*—F. L. Evans
*Attorney, Agent, or Firm*—Kenway & Jenney

[57] ABSTRACT

The three-dimensional display system disclosed herein employs the varying focal properties of a vibrating mirror to cause sequentially generated image components to appear juxtaposed in space. The mirror is constructed as a circular reflective plate having substantial stiffness and resilience. The plate is weighted about its rim and is supported by a flexible support ring engaging the plate along a concentric circular locus spaced inside of the rim so as to provide a useful curvature over substantially the entire surface of the plate.

11 Claims, 6 Drawing Figures

THREE-DIMENSIONAL DISPLAY

BACKGROUND OF THE INVENTION

The present invention relates to three-dimensional display systems and more particularly to such a system employing a reflective plate weighted at its rim and vibrating in an essentially resonant mode.

Three-dimensional (3-D) display systems have been proposed previously in which successive image components, generated in a single plane, are caused to appear juxtaposed in space when viewed in a membrane mirror which is vibrated to effect a varying focal length. Such mirrors have been constructed as diaphragms which yield useful curvatures owing to the tension in the membrane which opposes a pressure differential across the diaphragm produced, for example, by a loudspeaker. One such system is described in U.S. Pat. No. 3,493,290, issued Feb. 3, 1970 to Alan C. Traub and also in a May 1968 Mitre Corporation report M68-4 entitled "A New 3-Dimensional Display Technique".

Diaphragm mirrors, however, have several inherent problems. In order to obtain a flicker-free operation, it is necessary to vibrate the mirror at a frequency of about 30 cycles per second. In that such frequencies are within or adjacent the audible or sensory range, the size of the diaphragm becomes limited by the acoustic energy given off by the mirror. In other words, the near field sound pressure level adjacent a large vibrating diaphragm may be simply intolerable for a person who should be in close proximity to the mirror in order to carefully view the image. Likewise, as a diaphragmatic mirror is made larger, its natural resonant frequency goes down. Thus, any attempt to oscillate it at a flicker-free frequency may cause the excitation of higher modes of oscillation which are acoustically undesirable and which will create severe distortions in the appearance of the image.

Another problem with diaphragmatic mirrors is that the mirror displacement and shape are highly sensitive to the spectral purity of the driving waveform and any distortion in the signal energizing the loudspeaker or any distortion generated in the loudspeaker itself or any distortions generated in the air coupling between loudspeaker and diaphragmatic mirror can distort the desired juxtaposition in space of the image elements. Accordingly, it has typically been impossible to utilize the travel of the diaphragm in both directions for the reason that the velocity profile in the one direction is not the exact complement of the velocity profile in the other direction. While the departure from sinusoidal movement does not distort unacceptably an image produced during travel in one direction, the effect of having a displacement between image components which are intended to appear in the same plane, though generated during alternate half-cycles, is defeating of the entire purpose of the display. A further problem is that such diaphragms, being typically constructed as metalized plastic films, are very difficult to clean without damage.

Among the several objects of the present invention may be noted the provision of a display system providing three-dimensional images of high quality; the provision of such a display system which will create images of relatively large size; the provision of such a display system which involves relatively low acoustic output; the provision of such a display system which is relatively long-lived and easy to maintain; the provision of such a display system which is highly reliable and of relatively simple and inexpensive construction. Other objects and features will be in part apparent and in part pointed out hereinafter.

SUMMARY OF THE INVENTION

Briefly, a three-dimensional display system according to the present invention employs, as a variable focus mirror, a circular reflective plate having substantial stiffness and resilience. Weighting means are attached to and distributed around the rim of the plate, the mass of the weighting means being greater than that of the plate itself. The plate is supported by an annular support ring along a concentric circular locus which is substantially inside of the rim of the plate. An oscillatory force is supplied to the plate, preferably in its central portion, to drive the plate into essentially resonant oscillation with the motion of the rim being 180° out-of-phase with the motion of the central portion. Means are provided for generating, in a plane, successive image components in synchronization with the oscillation of the plate at different phases thereof, the image generating means being positioned so as to be viewable by way of the reflective plate. Accordingly, the image components so viewed appear juxtaposed in space in accordance with the variation in the effective focal length of the mirror.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
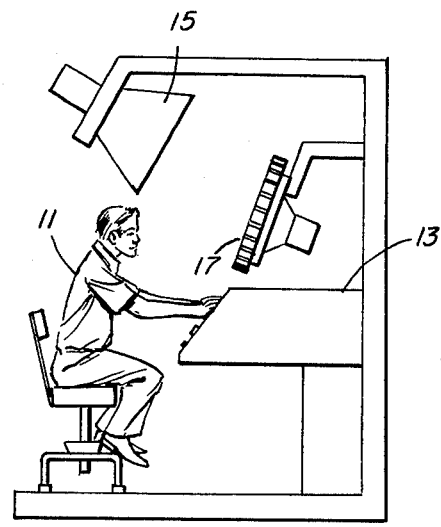
FIG. 1 is a diagram illustrating one possible physical arrangement of the components of a display system according to the present invention.

Referring now to FIG. 1, a presently preferred configuration of the apparatus is illustrated in which a viewer, designated by reference character 11, can be seated at a control console 13 and can view a cathode ray tube (CRT) 15 by way of an oscillatory mirror 17 constructed in accordance with the present invention. As will be understood by those skilled in the art, the CRT 15 constitutes a means for generating, in a single plane, successive image components. In that the successive image components, though generated in a single plane, will ultimately be juxtaposed in space as perceived by the viewer 11, the CRT is preferably provided with a phosphor of extremely low persistance. This minimizes streaking caused by light emitted after the actual instant of writing of a particular image component.

Figure 2:
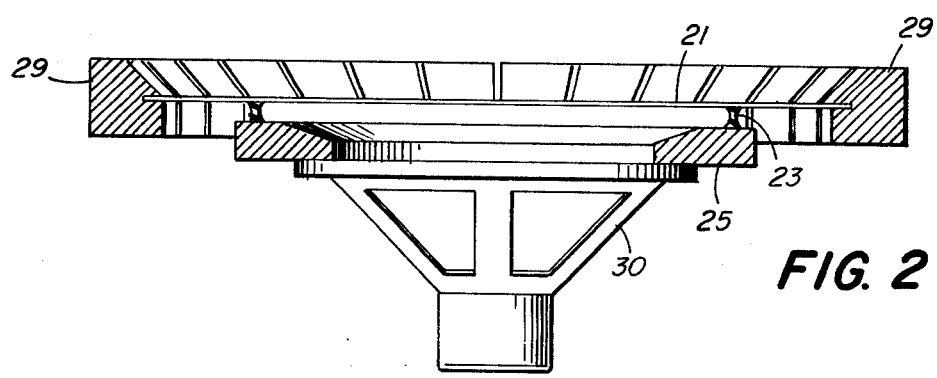
FIG. 2 is a sectional view illustrating the cross-section of a variable-focus reflective plate employed in the system of the present invention.

In accordance with the practice of the present invention, the mirror 17 is constructed as a plate having substantial stiffness and resilience, i.e. as compared with the tensioned diaphragms of the prior art. In FIG. 2, this plate is indicated by a reference character 21. The presently preferred form of plate is a front silvered acrylic plate. The mirror plate 21 may be constructed by front silvering a commercially available sheet of acrylic plastic and then clamping the sheet, mirrored surface down, in a vacuum chuck and grinding off the back surface to obtain a uniform thickness. As is explained in greater detail hereinafter, a uniform thickness will yield an optically useful curvature of the plate 21 when rim weighting is employed in the course of practice of the invention. It should be understood, however, that variations of thickness radially might also be employed to modify the stiffness characteristics and thereby augment the focusing properties of the mirror.

Rather than being mounted at its periphery in the manner of a diaphragm, the circular plate 21 is supported at a concentric circular locus which is substantially inside of the rim of the plate. The form of support illustrated is a flexible ring 23 of Buna-N-rubber which is cemented both to the plate 21 and to a massive metal support ring 25. A suitable adhesive is a mixture of epoxy and polyamide resins such as that sold under the trademark 2-TON by the Devcon Company. Preferably, the ring 23 is shaped with an hourglass cross-section, as illustrated, to provide a high degree of compliance and a large gluing area not maximally stressed at the edges, both provisions desirable in accommodating oscillatory vibration of the plate 21 as described hereinafter.

Figure 3:
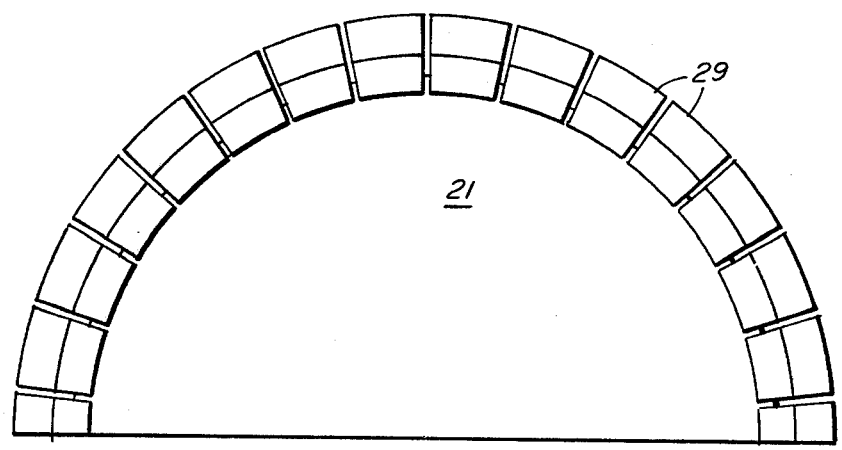
FIG. 3 is a plan view of the reflective plate of FIG. 2 showing the segment form of rim weighting employed.

Weighting means 29 are attached to and distributed around the rim of the plate 21. The mass of the weighting means is greater than that of the plate itself, so that this mass strongly affects the shape which the plate 21 assumes in vibration. The general effect of the added weight of the rim is to produce an optically desirable curvature across the full diameter of the plate, the natural deflection mode of a flat plate without weighting having an inflection and therefore being optically useful over only a central portion of the plate. While a continuous weighting ring can be used, it is preferred that the weighting means be discontinuous around the periphery of the plate 21, so that the mass at each angular position is free to act essentially independently. In the embodiment illustrated in FIGS. 2-4, this is achieved by constructing the weighting means as a multiplicity of metal or plastic segments 29, each of which is grooved so as to be a close fit over the rim of the plate, where it is glued in place. The individual segments are made small enough to minimize local discontinuity while being individually of a size which can be handled and conveniently attached. In one particular embodiment where the plate was 16 inches in diameter and 0.120 inches thick, 50 such segments were used, each weighing about 21 grams and having a nominal width of about 1 inch, a space of 0.02 inches being left between adjacent segments.

Figure 4:
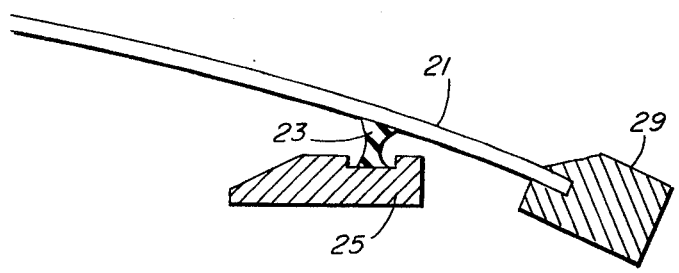
FIG. 4 is a sectional view, similar to FIG. 2, illustrating the mode of vibration of the variable focus plate.

An advantage of using a segmented weighted means is the propensity of each segment to, in effect, rock around an axis tangential to the plate rim. But since the segmented weights are rigidly glued to the edge of the plate, the propensity of each weight on its own to rock contributes to the bending of the adjacent portion of the plate. This rocking is illustrated in FIG. 4, the extent of the resultant deflection and bending being exaggerated.

Figure 5:
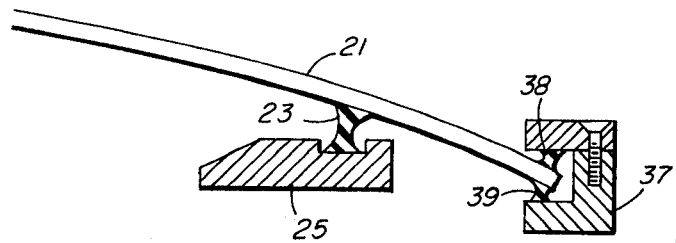
FIG. 5 is a sectional view of a variable-focus plate employing an alternative form of rim weighting.

The alternative of weighting with a solid ring 37 is illustrated in FIG. 5, the plate 21 again being shown with an exaggerated deflection. In that the rigid ring 37 does not distort with the plate, the movement of the ring is essentially pure translation as compared with the rocking or flapping of the segments 29 shown in FIG. 4. The ring 37 is mounted on the plate 21 by means of a pair of compliant rings 38 and 39, each of which is essentially similar to the mounting ring 23 which supports the plate 21 on the frame 25.

As with the diaphragmatic mirrors of the prior art, a convenient means of applying oscillatory energy to the variable focus mirror is by means of a loudspeaker. In FIG. 2, such a loudspeaker is indicated at 30 as being bolted to the support ring 25. As may be seen, the speaker is acoustically coupled to the central portion of the plate 21.

Energy from the loudspeaker is air coupled to the flexing mirror in both the prior art diaphragm mirror system and in the current plate system. In the diaphragm mirror system, the frequency of mirror oscillation is wholly dominated and determined by the frequency emerging from the loudspeaker, since this driving frequency must be well below the resonant frequency of the taut membrane to avoid the undesirable higher modes. However, in the plate mirror system, the frequency of mirror oscillation is dominated by the mechanically resonant frequency of the stiff plate with its edge weighting. The design of the plate, therefore, including its stiffness, its edge weighting, its diameter, and its support, must be such that its resonant frequency is the desired frequency of oscillation, which typically is 30 Hz. Small deviations from this design goal of 30 Hz can easily be accommodated in the driving electronics, so that, e.g., a plate with a fundamental resonance at 31 Hz can be driven at 31 Hz and the CRT suitably driven so as to maintain frequency and phase synchrony with the oscillating plate mirror.

The flexing mode in which the plate/weighting means system operates is one in which the movement of the rim is out-of-phase with the motion of the central portion of the plate 21, there being a circular node spaced somewhat inside of the rim of the plate. The location of the support ring is chosen to produce a most desirable curvature distribution across the face of the mirror from the point of view of the desired optical characteristics. In this regard, it has been found that the diameter of the support ring is preferably about 8% of the diameter of the plate.

The operation in the principal resonant mode tends to enforce pure sinusoidal behaviour and to be economical of driving power, both of which contribute to quietness. Counteracting influences to sinusoidal behaviour are harmonic contamination of the driving waveform, and insufficient compliance in the rubber support ring, but each of these influences can be held to insignificant proportions by suitable attention to their origins.

A plate mirror of this design may be made in almost any size, the practical upper limit being set by the tolerable sound pressure levels at 30 Hz, and/or by the size of the planar images whose juxtaposed reflections form the three-dimensional image sought. This degree of flexibility in size is in strong contradistinction to the prior art membrane mirrors in which the practical upper limit in size was set by the excitation of higher modes of vibration, there being available no counteracting influences except for more membrane tension and much more driving power.

Figure 6:
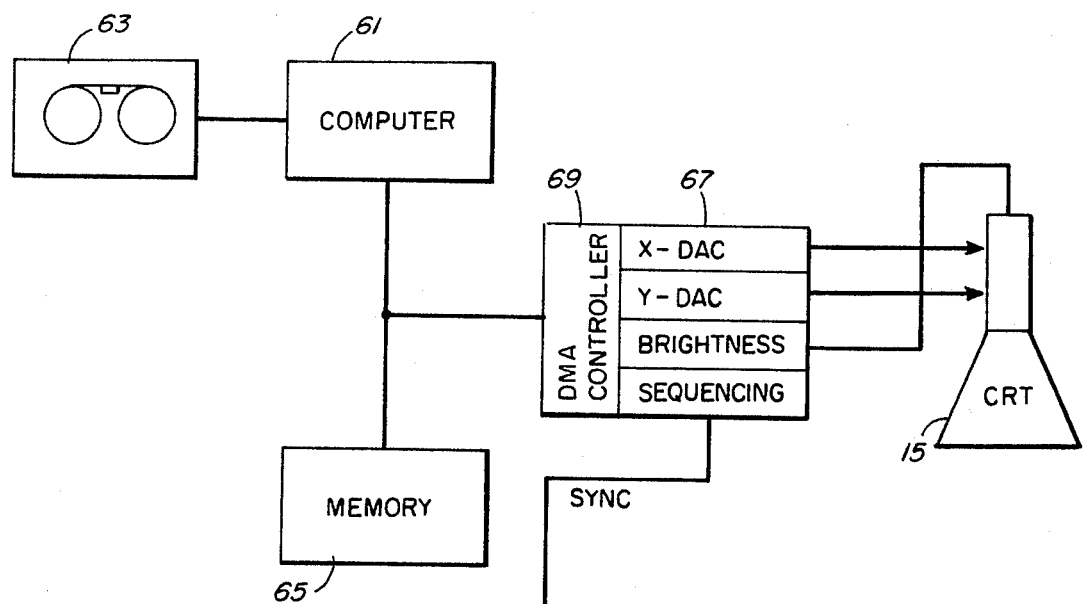
FIG. 6 is a block illustrating one implementation of the electronic components employed in conjunction with the present invention.

The method employed for energizing the CRT 15 to create sequential image components which will be dispersed in space by the variable focal length of the mirror 17 is, in general, similar to the technique contemplated by the prior art membrane mirror systems. As indicated in FIG. 6, a computer 61 processes data obtained from an original source, e.g. a disc memory or digital tape recorder 63, to obtain orthogonal (x,y,z) coordinates representing the location of each image element together with brightness information for each image element. These picture elements are conventionally designated in the art as pixels. This converted data is preferably stored in a random access memory 65 in an ordered array appropriate for presentation to the CRT drive circuitry, indicated at 67, in an appropriate sequence. Preferably, the CRT drive circuitry 67 incorporates a geometry correction to compensate for the anomalous perspective created by the changing focal length of the mirror, as described by Traub. As an alternative, however, this correction might be performed by the computer program.

In order to permit the CRT controller 67 to acquire the formated data at a rate enabling an appropriate number of pixels to be displayed during each cycle of oscillation of the mirror, the CRT controller 67 preferably obtains this data through a direct memory access (DMA) channel. A direct memory access controller appropriate for coordinating memory access by the computer 61 and the CRT controller 67 is indicated at 69 in FIG. 6.

As will also be understood by those skilled in the art, the CRT controller 67 will typically comprise a pair of high-speed digital-to-analog (D/A) converters for driving the x and y channels of the CRT in response to the digital data representing the x and y pixel locations, a brightness D/A converter, and also a sequencer for initiating the acquisition of data corresponding to each z plane in appropriate synchronism with sequential phases of the sinusoidal oscillation of the mirror. While the above-described general computer architecture has been found preferred in one particular implementation of a display system according to the present invention, it is clear that other architectures could be used as will be apparent to those skilled in the art.

As indicated previously, the mirror of the present invention should be driven at its principal resonant frequency. For this purpose, an appropriate oscillator 71 and power amplifier 73 are indicated for driving the speaker 30. In this embodiment, synchronization signals are indicated as are applied from the CRT controller 67 to the oscillator 71 so as to keep the oscillations of the mirror in synchronism with the sequence in which the image elements are generated. It should be understood, however, that the speaker might be driven by a free-running oscillator to run at its resonant frequency and that synchronization signals might be applied in the other direction, so that the mechanical movement of the mirror initiates the sequential generation of image elements by triggering off the sequence of direct memory accesses of the stored data.

An advantage of operation with the mirror of the present invention is that images can be written during both halves of the mirror oscillation. This ability flows from the stiffness and inherent resonant operation of the plate/weighting means combination so that the oscillatory movement is very closely sinusoidal. Thus, image elements written at complementary phase positions in the oscillatory cycle will appear in the same perceived image plane. Accordingly, for a given writing speed, twice as many image elements or pixels can be used to create an image as would be possible with a diaphragm mirror where only the travel in one direction can be used. As will be understood, this greatly increases the usefulness of the apparatus in displaying images of any complexity.

Another substantial advantage of the mirror of the present invention is that the radiated sound pressure level is markedly less than that from a diaphragm mirror of the same size. In that the flexible support for the mirror is located in a position that is spaced inwardly from the rim and since the rim and the central portion of the plate undergo movement in opposite axial directions, the mirror radiates as a quadrupole rather than as a dipole. Thus, the radiation efficiency is markedly reduced, particularly at the frequencies involved, e.g. 30 Hz, where the acoustic wavelength is substantially longer than the dimensions of the display system. In essence, the high pressure zone generated on a forward moving central portion of the plate is discharged into the low-pressure zone created by the oppositely moving rim rather than being radiated into the surrounding space. Accordingly, a viewer can position himself in much closer proximity to the vibrating mirror without undergoing discomfiture because of the sound pressure levels. The need for interfering acoustic barriers may thus usually be obviated. An advantage of the plate construction itself is that the mirror can be relatively easily cleaned, employing only the precautions normally exercised when cleaning front surface mirrors.

In view of the foregoing, it may be seen that several objects of the present invention are achieved and other advantageous results have been obtained.

As various changes could be made in the above constructions without departing from the scope of the invention, it should be understood that all matter contained in the above description or shown in the accompanying drawings shall be interpreted as illustrative and not in a limiting sense.

What is claimed is:

1. A three-dimensional display system comprising:
 a circular reflective plate having substantial stiffness and resilience;
 weighting means attached to and distributed around the rim of said plate, the mass of said weighting means being greater than that of the plate itself;
 means for compliantly supporting said plate along a concentric circular locus which is substantially inside of the rim of said plate;
 means for applying an oscillatory force to said plate to drive the plate into oscillation with the motion of the rim being out-of-phase with the motion of said central portion; and
 means for generating, in a plane, successive image components which are produced in synchronization with the oscillation of said plate at different phases thereof, the image-generating means being positioned so as to be viewable by way of said reflective plate, whereby the image components so viewed appear juxtaposed in space in accordance with the variation in effective focal length of said mirror.

2. A display system as set forth in claim 1 wherein said weighting means comprises a series of weight segments rigidly attached to the rim of said plate.

3. A display system as set forth in claim 1 wherein said weighting means comprises a rigid ring compliantly connected to the rim of said plate.

4. A display system as set forth in claim 1 wherein said image-generating means includes a cathode ray tube.

5. A display system as set forth in claim 1 wherein said force-applying means comprises a loudspeaker acoustically coupled to the central portion of said plate.

6. A three-dimensional display system comprising:
- a circular reflective plate having substantial stiffness and resilience;
- weighting means attached to and distributed around the rim of said plate, the mass of said weighting means being greater than that of the plate itself;
- a flexible, annular support ring for supporting said plate along a concentric circular locus which is substantially inside of the rim of said plate;
- means for applying an oscillatory force to the central portion of said plate to drive the plate into essentially resonant oscillation with the motion of the rim being out-of-phase with the motion of said central portion; and
- means for generating, in a plane, successive image components which are produced in synchronization with the oscillation of said plate at different phases thereof, the image-generating means being positioned so as to be viewable by way of said reflective plate, whereby the image components so viewed appear juxtaposed in space in accordance with the variation in effective focal length of said mirror.

7. A display system as set forth in claim 6 wherein said weighting means comprise a series of weight segments rigidly attached to the rim of said plate.

8. A display system as set forth in claim 6 wherein the diameter of said locus is about 80% of the diameter of said plate.

9. A display system as set forth in claim 6 wherein said support ring has a hourglass-shape cross-section.

10. A display system as set forth in claim 6 wherein said plate is acrylic plastic.

11. A three-dimensional display system comprising:
- a circular plate having substantial stiffness and resilience, said plate being reflective to one side;
- a series of weight segments attached to and distributed around the rim of said plate, the mass of said weight segments being greater than that of the plate itself;
- a flexible, annular support ring attached to and supporting said plate along a concentric circular locus on the opposite side of said plate, the diameter of the locus being about 80% of the diameter of said plate;
- means including a loudspeaker for applying an oscillatory force to the central portion of said plate to drive the plate into essentially resonant oscillation with the motion of the rim being out-of-phase with the motion of said central portion; and
- means including a cathode ray for generating, in a plane, successive image components which are produced in synchronization with the oscillation of said plate at different phases thereof, the image-generating means being positioned so as to be viewable by way of said reflective plate, whereby the image components so viewed appear juxtaposed in space in accordance with the variation in effective focal length of said mirror.

* * * * *